United States Patent
Baraban et al.

(10) Patent No.: US 7,065,658 B1
(45) Date of Patent: Jun. 20, 2006

(54) METHOD AND APPARATUS FOR SYNCHRONIZING AND RECHARGING A CONNECTOR-LESS PORTABLE COMPUTER SYSTEM

(75) Inventors: Matthieu Baraban, Saint Jean De Vedas (FR); Yann Cheri, Montpellier (FR)

(73) Assignee: Palm, Incorporated, Sunnyvale, CA (US)

( * ) Notice: Subject to any disclaimer, the term of this patent is extended or adjusted under 35 U.S.C. 154(b) by 479 days.

(21) Appl. No.: 09/861,276

(22) Filed: May 18, 2001

(51) Int. Cl.
G06F 1/26 (2006.01)
H02J 7/00 (2006.01)

(52) U.S. Cl. .................. 713/300; 320/108; 455/556.2; 455/573; 707/203

(58) Field of Classification Search ............... 320/108; 455/556.2; 707/203
See application file for complete search history.

(56) References Cited

U.S. PATENT DOCUMENTS

| | | | |
|---|---|---|---|
| 5,375,226 A | 12/1994 | Sano et al. | 395/500 |
| 5,455,466 A * | 10/1995 | Parks et al. | 307/104 |
| 6,006,274 A | 12/1999 | Hawkins et al. | 709/248 |
| 6,138,245 A * | 10/2000 | Son et al. | 713/400 |
| 6,266,539 B1 * | 7/2001 | Pardo | 455/556.2 |
| 6,330,436 B1 * | 12/2001 | Zidel | 455/412.2 |
| 6,389,423 B1 * | 5/2002 | Sakakura | 707/10 |
| 6,405,049 B1 * | 6/2002 | Herrod et al. | 455/517 |
| 6,445,936 B1 * | 9/2002 | Cannon et al. | 455/573 |

FOREIGN PATENT DOCUMENTS

| | | |
|---|---|---|
| EP | 0 395 469 | 10/1990 |
| FR | 2 601 161 | 1/1988 |

OTHER PUBLICATIONS

Opticon, "User's Manual DWT 7133", Nov. 2000.*
Mel B. W. et al.: "Tablet: Personal Computer in the Year 2000" Communications of the Association for Computing Machinery, New York, NY vol. 31, No. 6 Jun. 1, 1988 pp. 639-646 XP000047633ISSN: 0001-0782.

* cited by examiner

*Primary Examiner*—Chun Cao
*Assistant Examiner*—Albert Wang (57) ABSTRACT

A ruggedized connector-less cordless portable computer system is disclosed. In one embodiment, the portable computer system includes ports adapted to use wireless technology e.g., GSM. CDMA, LAN, Bluetooth, and infrared for synchronization. Furthermore, the device may be a palm-sized device having a rechargeable battery. In one embodiment of the present invention, the portable computer system includes a secondary coil of a transformer where the transformer's primary coil resides in an electronic cradle. The portable computer's rechargeable battery is recharged through an induction charging system. The wireless communication and induction charging system enables a device that is connector-less and therefor watertight and resilient to adverse climate conditions.

20 Claims, 9 Drawing Sheets

METHOD AND APPARATUS FOR SYNCHRONIZING AND RECHARGING A CONNECTOR-LESS PORTABLE COMPUTER SYSTEM

BACKGROUND OF THE INVENTION

1. Field of the Invention

The present invention relates to the field of computer systems and data communication. More specifically embodiments of the present invention relate to the field of portable electronic devices, such as personal digital assistants (PDAs), cell phones, pagers, etc.

2. Related Art

The demand for use of computers has steadily grown over the period of the past several decades. The ever-increasing demand in use of the computers and widespread reliance of individuals as well as business entities on computers along with the reduction in the size of the components led to the innovation of portable computer systems. Shortly after the introduction of the portable computers to the marketplace, the users of these devices demanded flexibility in their use and portability. Consumers seeking mobility of their portable computers require wireless interconnectivity.

Manufacturers, in general, provide portable computer systems equipped with wireless technology. Most all portable computers in the marketplace, nowadays, are equipped with some means of wireless communication. More specifically, wireless technology is advancing, both in the number of options that are available for providing connectivity, and in their flexibility to provide general purpose data communication. Different technologies such as GSM with Short Massage Service (SMS), NBS (Narrow Band Sockets), cellular technologies (e.g., CDMA, TDMA), LAN access technologies (e.g., IEEE 802.11, Home RF) and PAN technologies (e.g., Bluetooth, IR), each address different set of needs, and provide different set of potential services. Many different applications are currently being developed for portable computer systems in order to make use of the wireless communication features offered by these platforms.

The popularity of portable computers caused favorable changes in manufacturing forecasts and manufacturing plans to satisfy the market demands. However, along with such increase in popularity came the consumer demand for new features, features commensurate with the nature and method of use of portable devices. The consumers demanded a smaller in size portable computer to ease portability, a larger size memory to satisfy the ever increasing applications supported by these portable computers, a longer lasting power supply to enable the users an uninterrupted sessions with a portable computers, and finally a device resilient to adverse climate conditions.

Regardless of all efforts by different manufacturers to satisfy the consumer's demands, the devices available in the marketplace are yet to address one important consumer demand, a portable computer with wireless capability and resilient to adverse climate conditions.

Typically, portable electronic devices are employed while the user is on the run, e.g., in business meetings, on business travel, personal travel, in a vehicle, on foot. etc. These devices are commonly accepted and are being used throughout a year and under different atmospheric conditions. A device may be used in a very moist environment, or left in a place where humidity is very high, or the user of a device may inadvertently expose a portable computer to water. The present portable electronic devices are not protected against such adverse atmospheric environments. The consumer requirements for a device resilient to adverse climate conditions have not even been addressed.

Thus a need exists for a portable computer system capable of wireless interconnectivity with other similar devices or with host computers which are capable of transceiving wireless communications. Furthermore, a need exist for a portable computer with wireless interconnectivity which can withstand adverse climate condition by minimizing exposure of its internal components to adverse climate conditions. Additionally, a need exist for a user friendly device, a device that is easily portable and conveniently rechargeable.

SUMMARY OF THE INVENTION

The present invention enables an owner of a handheld electronic device to have a wide range of wireless interconnectivity in a ruggedized, connector-less platform. The present invention further provides a handheld computer system with an induction charging system enabling the user of the device to recharge the device without the need of connectors or wires. Furthermore, use of induction charging system in combination with wireless synchronization allows manufacturers to build a watertight portable computer systems.

A ruggedized cordless portable computer system is disclosed. In one embodiment, the portable computer system includes ports adapted to use wireless technology e.g., GSM. CDMA, LAN, Bluetooth, and infrared for synchronization with a host computer system. Furthermore, the device is adapted to have a rechargeable battery that does not require a connector. In one embodiment of the present invention, the portable computer system may be a handheld device and includes a secondary coil of a transformer where the transformer's primary coil resides in an electronic cradle. The portable computer's rechargeable battery is recharged through an induction charging system. The wireless communication and charging system enables a manufacturer to provide a device that is watertight and ruggedized, e.g., resilient to adverse climate conditions.

More specifically, an embodiment of the present invention includes a portable computer system comprising: a) a processor coupled to a bus; b) a memory unit coupled to the bus; c) a flat panel display screen coupled to the bus; d) a wireless communication port for communicating with a host computer system to perform data synchronization; e) an internal battery; and f) a wireless charging system for providing charge to the internal battery.

DETAILED DESCRIPTION OF THE INVENTION

Reference will now be made in detail to the preferred embodiments of the present invention, a method and apparatus for synchronizing and recharging a cordless handheld personal information system, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be recognized by one of ordinary skill in the art that the present invention may be practiced without these specific details. In other instances, well-known methods, procedures, components, and circuits have not been described in detail as not to unnecessarily obscure aspects of the present invention.

Exemplary Palmtop Computer System Platform

The present invention is compatible with any electronic device having a wireless or other communication mechanism and organized records of information, such as a cell phone or a pager. One of the common types of electronic systems, which can be used in accordance with one embodiment of the present invention, is referred to as a personal digital assistant, or commonly called a PDA. The PDA is a pocket sized electronic organizer with the capability to store telephone numbers, addresses, daily appointment, and software that keeps track of business or personal data such as expenses, etc. Furthermore, the PDA also has the ability to connect to a personal computer, enabling the two devices to exchange updated information that is synchronizing the information between the two devices. Additionally, the PDA can also be connected to a modem, enabling it to have electronic mail (e-mail) capabilities over the Internet along with other Internet capabilities. Moreover, an advanced PDA can have Internet capabilities over a wireless communication interface (e.g., radio interface).

In particular, the PDA can be used to browse Web pages located on the Internet. The PDA can be coupled to a networking environment. It should be appreciated that embodiments of the present invention are well suited to operate within a wide variety of electronic systems (e.g., computer systems) which can be communicatively coupled to a networking environment, including cellular phones, pagers, etc.

Figure 1:
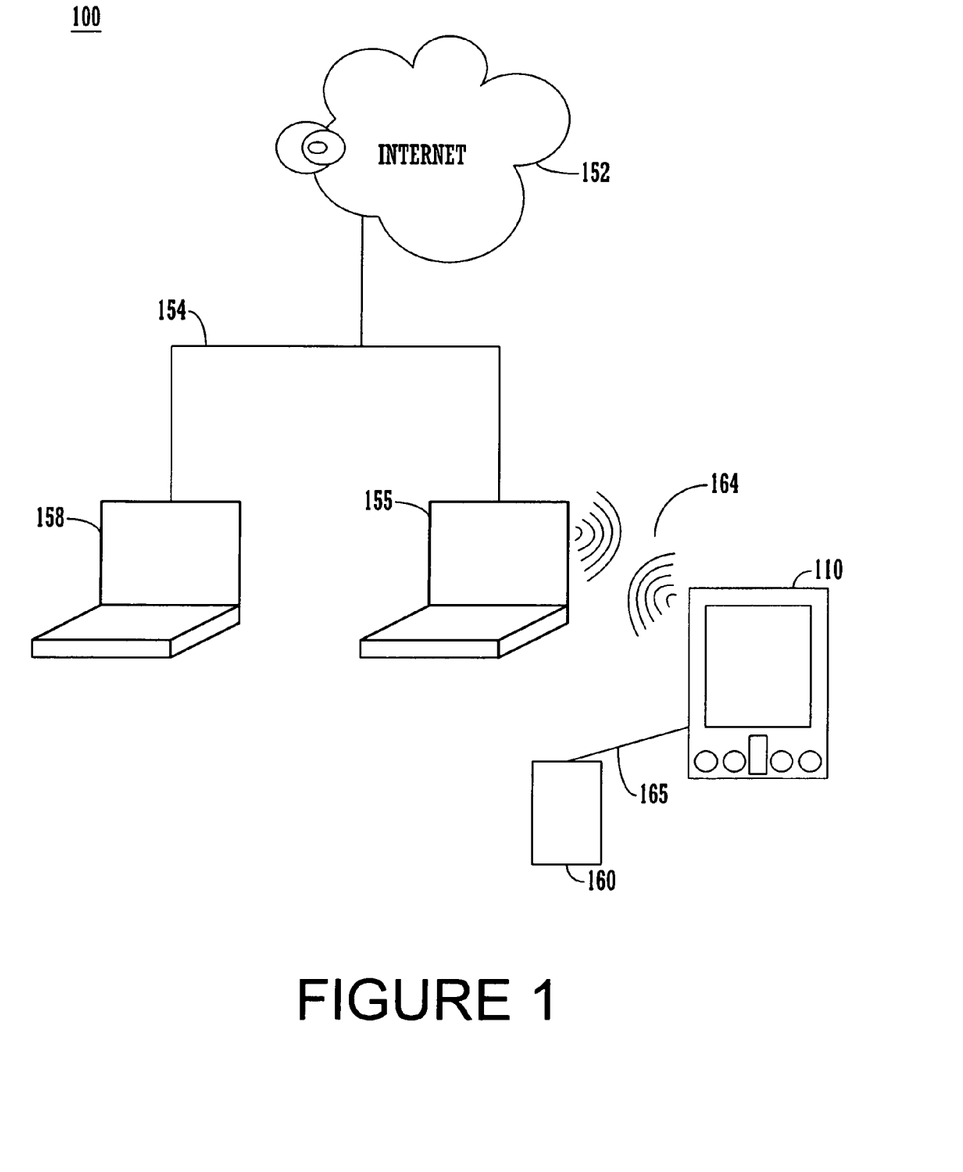
FIG. 1 is an illustration of a portable computer system or a "palm-sized" computer system connected to other computer systems and the Internet via a wireless communication link.

FIG. 1 is a block diagram of an exemplary network environment 100 including an exemplary Personal Digital Assistant (PDA) 110. The PDA 110 is also known as a palmtop or palm-sized electronic system or portable computer system. The PDA 110 has the ability to transmit and receive data and information over a wireless communication interface (e.g., a radio interface). The PDA 110 is one exemplary implementation on which the present invention can operate, although the present invention can operate on any portable electronic system or device.

In one embodiment, base station 155 is both a transmitter and receiver base station, which can be implemented by coupling it into an existing public telephone network 154. Implemented in this manner, base station 155 enables the personal digital assistant 110 to communicate with a proxy server computer system 158, which is coupled to the existing public telephone network 154. Furthermore, proxy server computer system 158 is coupled to the Internet 152, thereby enabling the PDA 110 to communicate with the Internet 152. It should be further appreciated that other embodiments of a communications network may be utilized in accordance with the present invention.

The data and information which are communicated between base station 155 and the personal digital assistant 110 are any type of information and data that can conventionally be transferred and received over a public telephone wire network system. However, a wireless communication interface is utilized to communicate data and information between the PDA 110 and base station 155. It should be appreciated that one embodiment of a wireless communication system in accordance with the present invention is the Mobitex wireless communication system.

Figure 2:
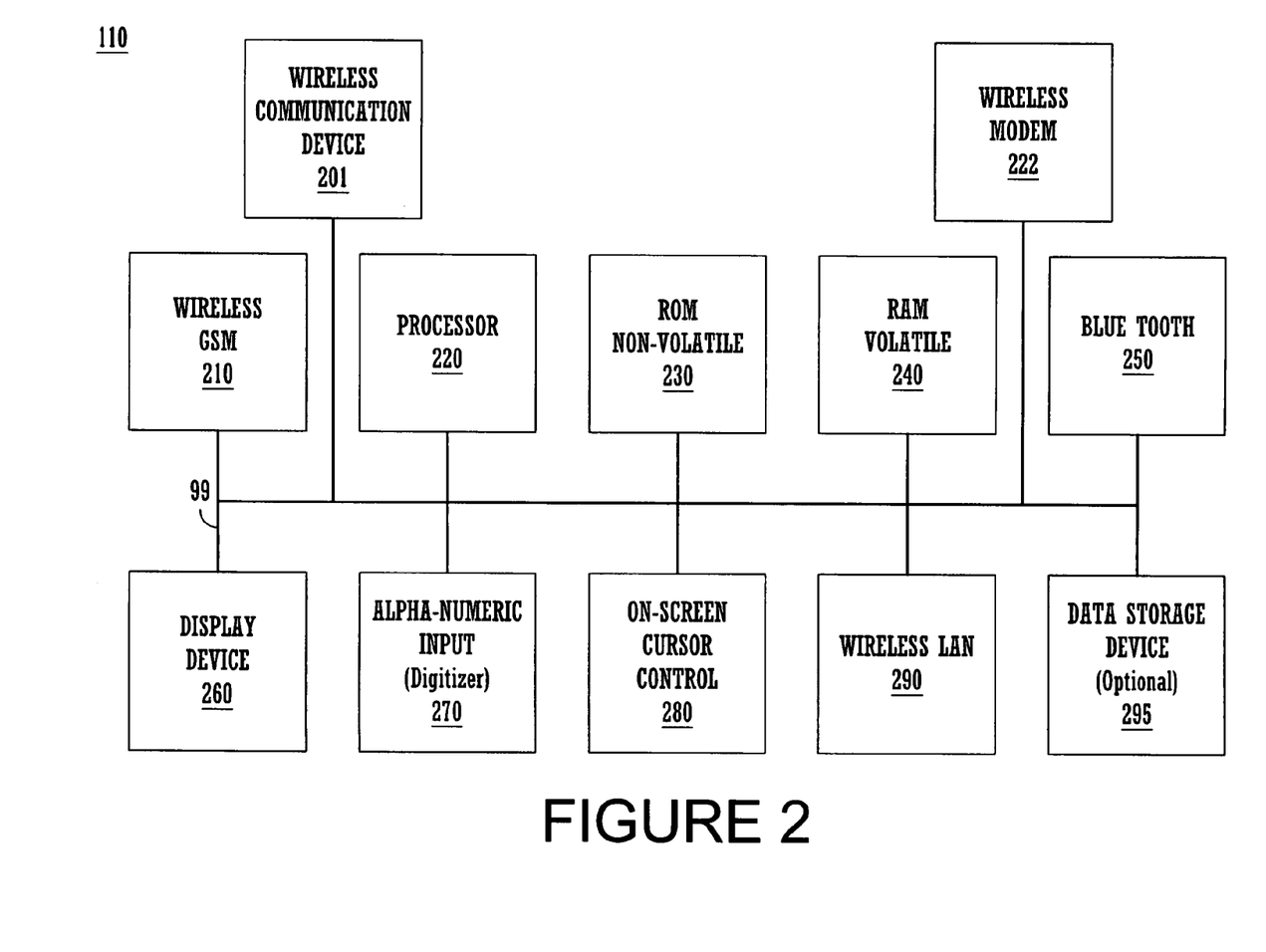
FIG. 2 is a logical block diagram of an exemplary portable computer system in accordance with an embodiment of the present invention.

FIG. 2 illustrates circuitry of portable computer system 200. Portable computer system 110 includes an address/data bus 99 for communicating information, a central processor 220 coupled with the bus 99 for processing information and instructions, a volatile memory 240 (e.g., random access memory RAM) coupled with the bus 99 for storing information and instructions for the central processor 220 and a non-volatile memory 230 (e.g., read only memory ROM) coupled with the bus 99 for storing static information and instructions for the processor 220. Computer system 110 also includes an optional removable data storage device 295 (e.g., thin profile removable memory) coupled with the bus 99 for storing information and instructions. As described above, system 110 also contains a display device 260 coupled to the bus 99 for displaying information to the computer user.

Figure 4:
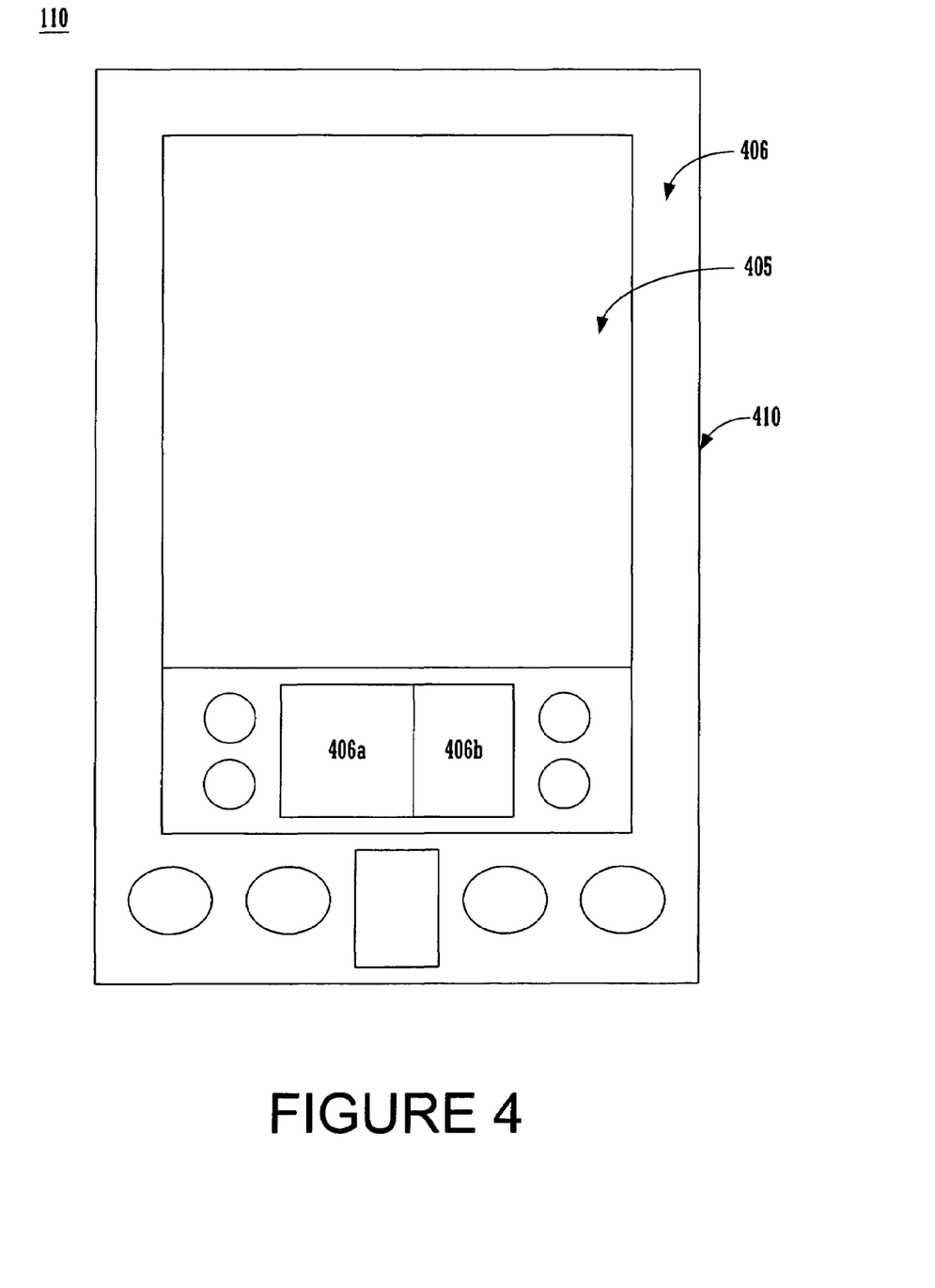
FIG. 4 is an illustration of the top face of an exemplary Personal Digital Assistant (PDA).

Also included in computer system 200 is an alphanumeric input device 270 which in one implementation is a handwriting recognition pad ("digitizer") having optional regions 406a and 406b (as shown in FIG. 4), for instance. Device 270 can communicate information (spatial data and pressure data) and command selections to the central processor 220.

System 110 also includes an optional cursor control or directing device 280 coupled to bus 99 for communicating user input information and command selections to central processor 220. In one implementation, device 280 is a touch screen device (also a digitizer) incorporated with screen 260. Device 280 is capable of registering a position on the screen 260 where the stylus makes contact and the pressure of the contact.

The display device 260 utilized with the computer system 110 may be a liquid crystal device, cathode ray tube (CRT), field emission device (FED, also called flat panel CRT) or other display device suitable for creating graphic images and alphanumeric characters recognizable to the user. Any of a number of display technologies can be used, e.g., LCD, FED, plasma, etc., for the flat panel display 260. In one embodiment, the display 260 is a flat panel multi-mode display capable of both monochrome and color display modes.

Wireless communication device (IR), IR 201, is included in the device 110 for communication with a host computer system 155 of FIG. 1 (or another portable computer system) using, an infrared device. System 110 may also include a wireless modem device 222 and/or a wireless radio 210, e.g., a GSM wireless radio with supporting chipset. The wireless modem device 222 is coupled to communicate with the processor 220. A Bluetooth wireless communication port 250 can also be included.

In one implementation, the Mobitex wireless communication system may be used to provide two way communications between system 110 and other networked computers and/or the Internet via a proxy server 158 of FIG. 1. In other embodiments, TCP protocol can be used or SMS can be used. System 110 may also contain batteries, replaceable cells or rechargeable batteries, for providing electrical power. Well-known electronic devices may be coupled to the battery to detect its energy level and the processor 201 can sample this information.

Figure 3:
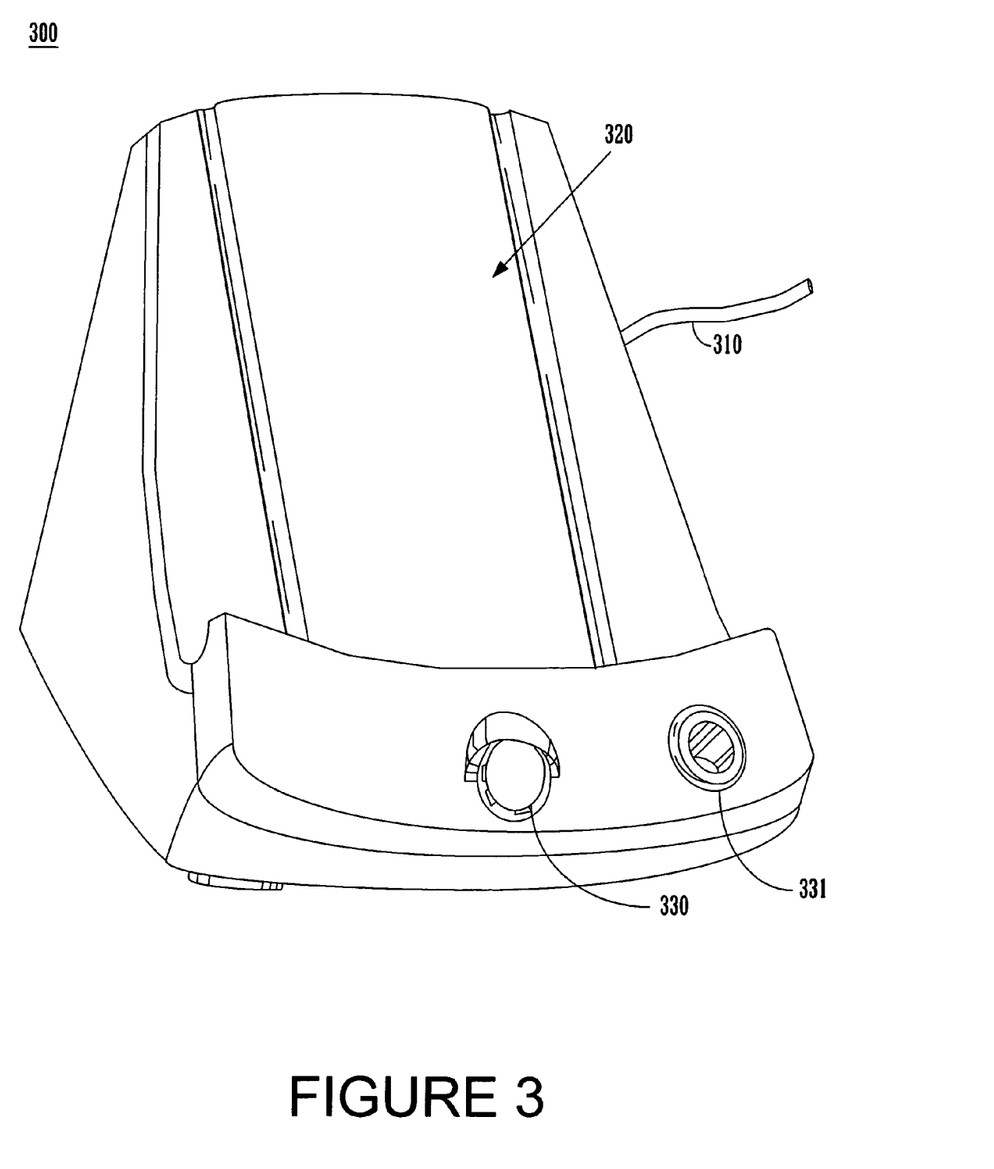
FIG. 3 is a perspective illustration of the top face of one embodiment of an electronic cradle without metal contacts for recharging the portable computer's rechargeable battery using induction charging.

FIG. 3 is a perspective illustration of an electronic cradle 300. One embodiment of the present invention, electronic cradle includes a primary coil of an induction transformer (as shown in 550 of FIG. 5). Electronic cradle 300 is electrically coupled to an alternating current source through an electrical cord 310. Recessed area 320 of electronic cradle 300 is designed to receive portable computer system 110 but contains no connectors. Electronic cradle 300 also includes a user interface 330 to activate synchronization function between portable computer system 110 of FIG. 1 and host device 155 of FIG. 1. A small LED 331 may indicate charging.

FIG. 4 is an illustration of the top face 410 of one embodiment of a portable computer system 110(e.g., a palm-size handheld computer system). The top face 410 contains a display screen 405 surrounded by a cover 406. The display screen 405 is a touch screen able to register contact between the screen and the tip of a stylus. FIG. 4 also illustrates a handwriting recognition pad or "digitizer" containing two regions 406a and 406b. Region 406a is for the drawing of alphabetic characters therein (and not for numeric characters) for automatic recognition, and region 406b is for the drawing of numeric characters therein (and not for alphabetic characters) for automatic recognition. Note that device 110 contains no physical connector for either synchronization or charging.

Figure 5:
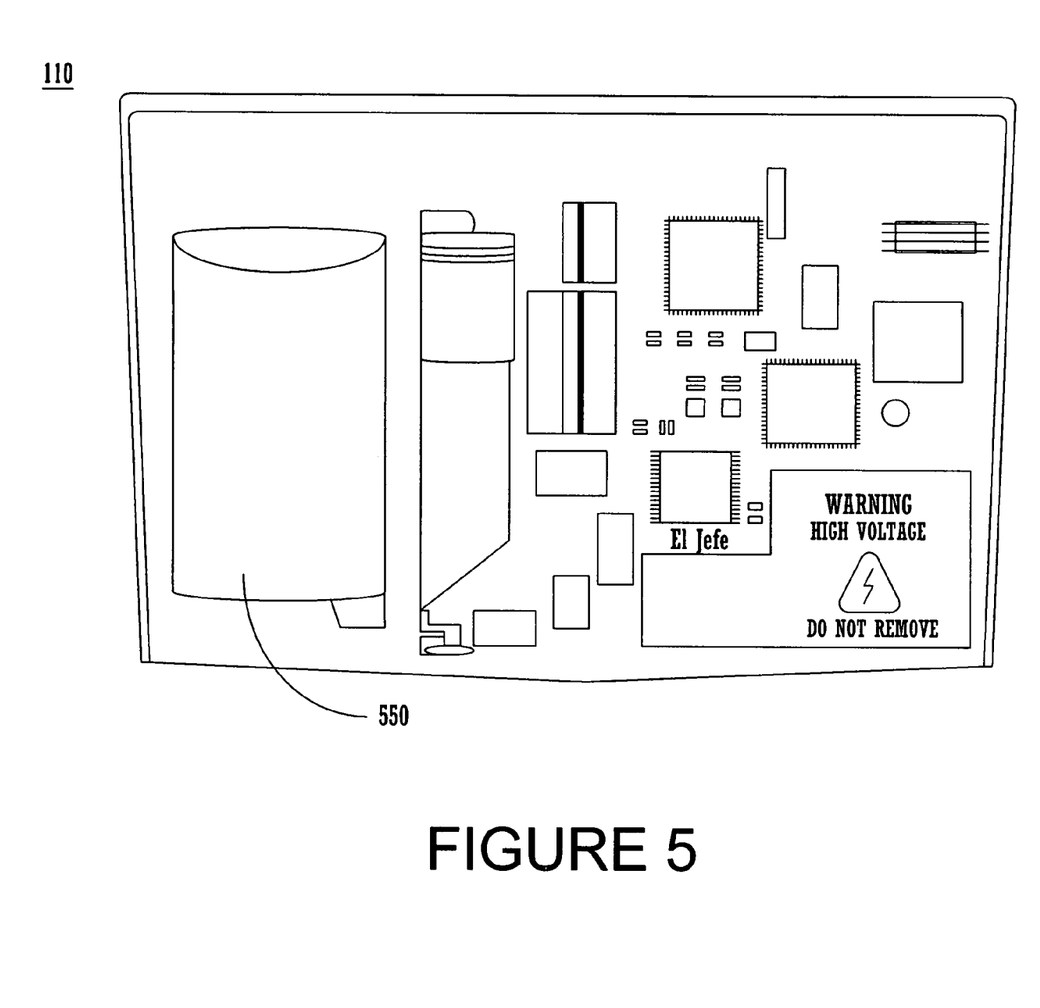
FIG. 5 is an illustration of the bottom side of a handheld computer system including secondary coil of a transformer and without serial connector.

FIG. 5 illustrates the backside of a portable computer system (e.g., a palm-sized computer system) 110 without its back cover. In one embodiment of the present invention, portable computer system 110 uses wireless technology for all communications between portable computer system 110 and all other devices equipped to receive such wireless communication. In this embodiment of the present invention, any serial connectors are eliminated because portable computer system 110 uses wireless technology (e.g., GSM with Short Massage Service (SMS), NBS (Narrow Band Sockets), cellular technologies (e.g., CDMA, TDMA), LAN access technologies (e.g., IEEE 802.11, Home RF) and PAN technologies (e.g., Bluetooth, IR)), for any type of host computer communication.

Figure 6:
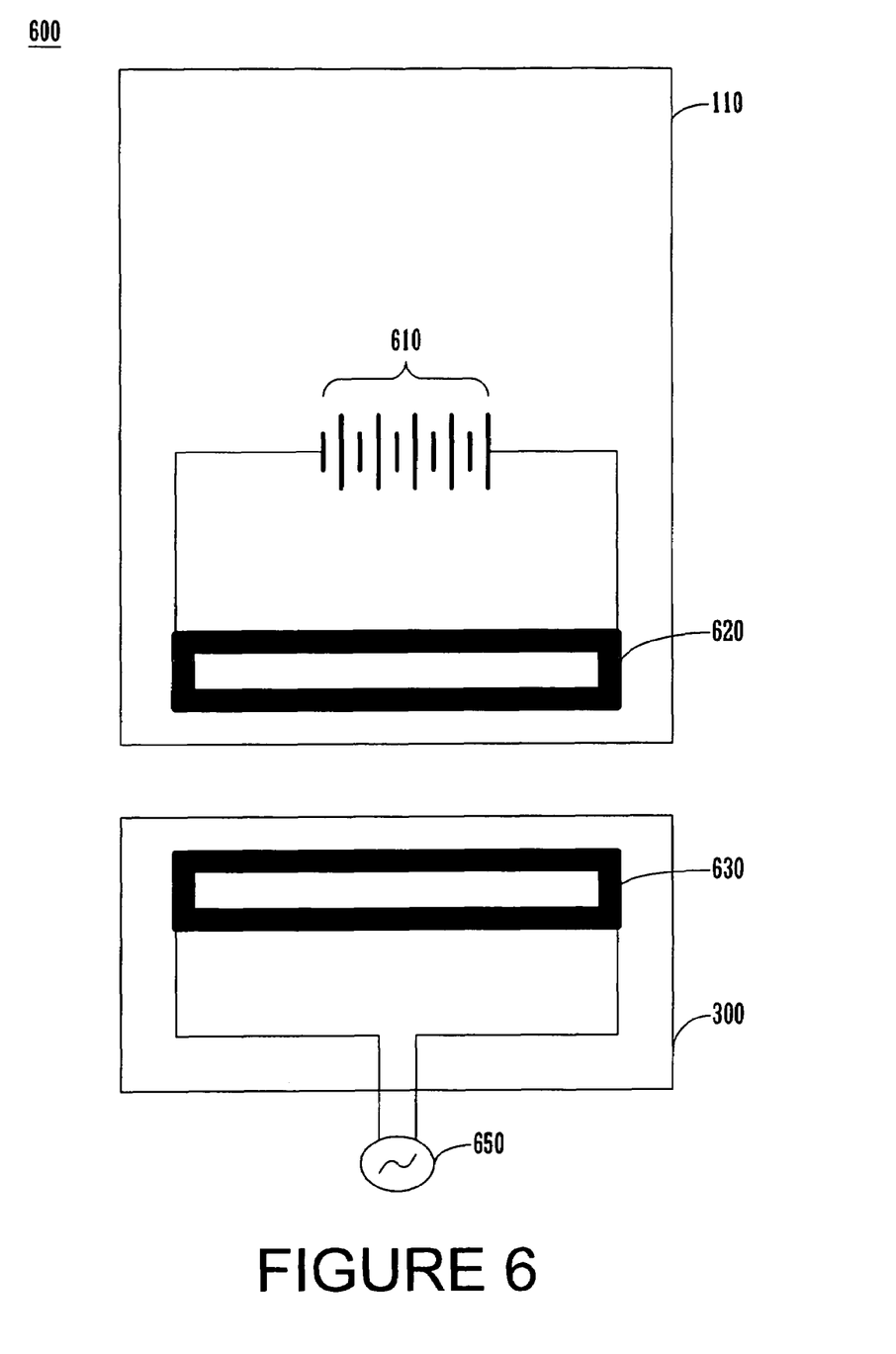
FIG. 6 is a schematic representation of a portable computer system with a secondary coil of the transformer and an electronic cradle including a primary coil of the transformer.

FIG. 6 depicts induction charging system 600 used in this embodiment of the present invention. In FIG. 6, the portable computer system 110 is placed onto the cradle 300, neither device has physical connector. Portable computer system 110 of FIG. 1 includes secondary coil 620 of transformer 550 of FIG. 5. Secondary coil 620 is electrically coupled to rechargeable battery 610. Primary coil 630 is electrically coupled to an alternating current source 650 within the cradle 300. Alternating electric current flowing in primary 630 induces voltage in secondary coil 620, which in turn charges rechargeable battery 610 (as shown in FIG. 7).

Figure 7:
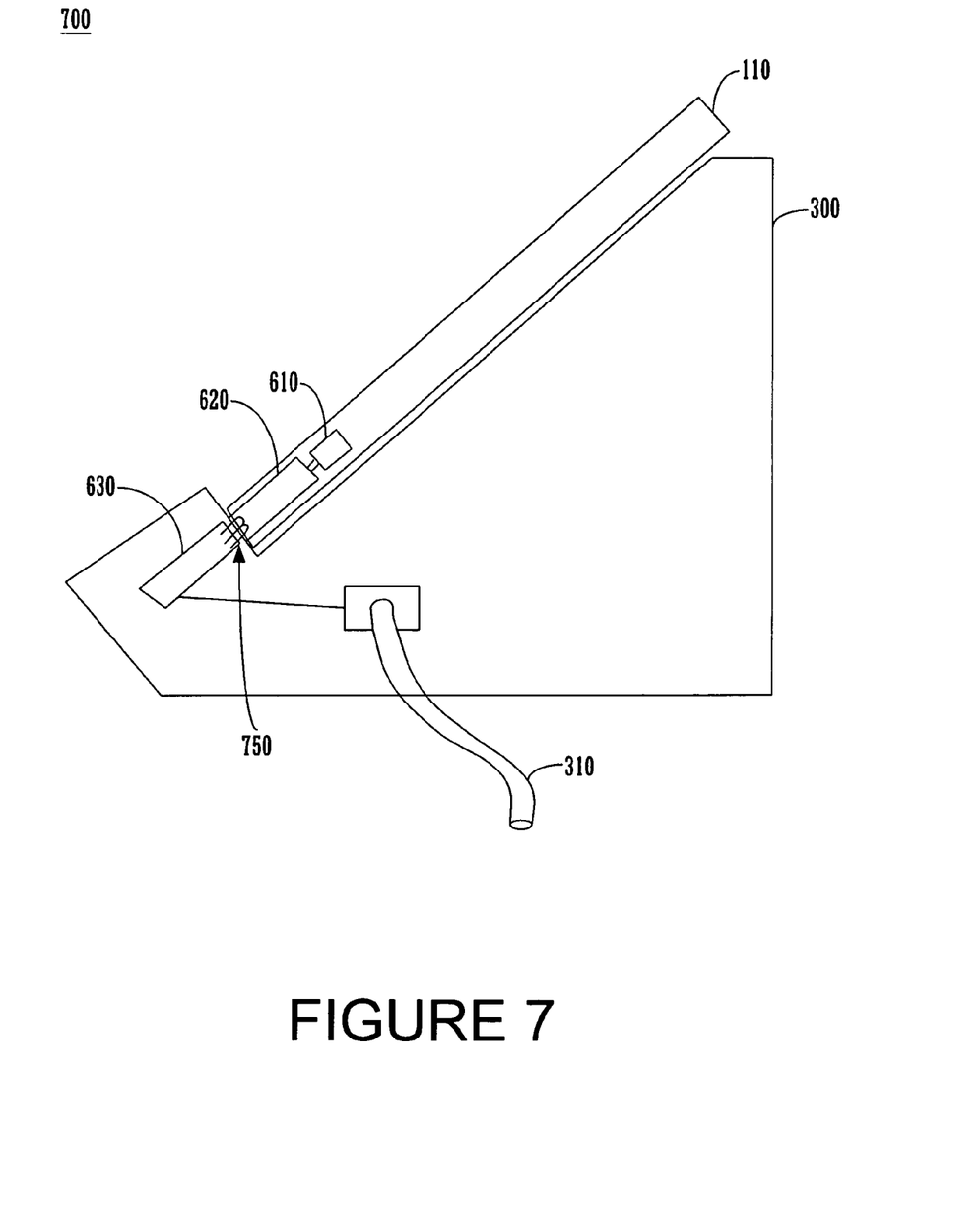
FIG. 7 depicts a portable computer system placed onto an electronic cradle for induction charging of the battery in the portable computer system.

FIG. 7 illustrate recharging of rechargeable battery 610 of FIG. 6. Portable computer system 110 is placed onto electrical cradle 300 of FIG. 3. Primary coil 630 of transformer 550 of FIG. 5 is electrically coupled to alternating source of power 650 of FIG. 6 through an electrical cord 310 of FIG. 3. Electronic cradle 300 does not include any metal or otherwise physical contact to cause recharging rechargeable battery 610 inside portable computer system 110. The recharging process is through induction system. Likewise, system 110 is connector-less.

Connector-less portable computer system 110 is placed onto electronic cradle 300 (as shown in FIG. 7), thus bringing secondary coil 620 and primary coil 630 within a short distance of each other. When Primary coil 630 is connected to alternating current source 550 the current flow in primary coil induces voltage in secondary coil 620 and the induced voltage charges rechargeable battery 610. It is appreciated that the induction system used for charging battery 610 does not require portable computer 110 to be removed from its protective casing nor does it require any metallic or physical contact or connector between electronic cradle 300 and portable computer system 110. When the cradle 300 is plugged in, charging may commence immediately upon the system 110 being placed onto cradle 300.

Figure 8:
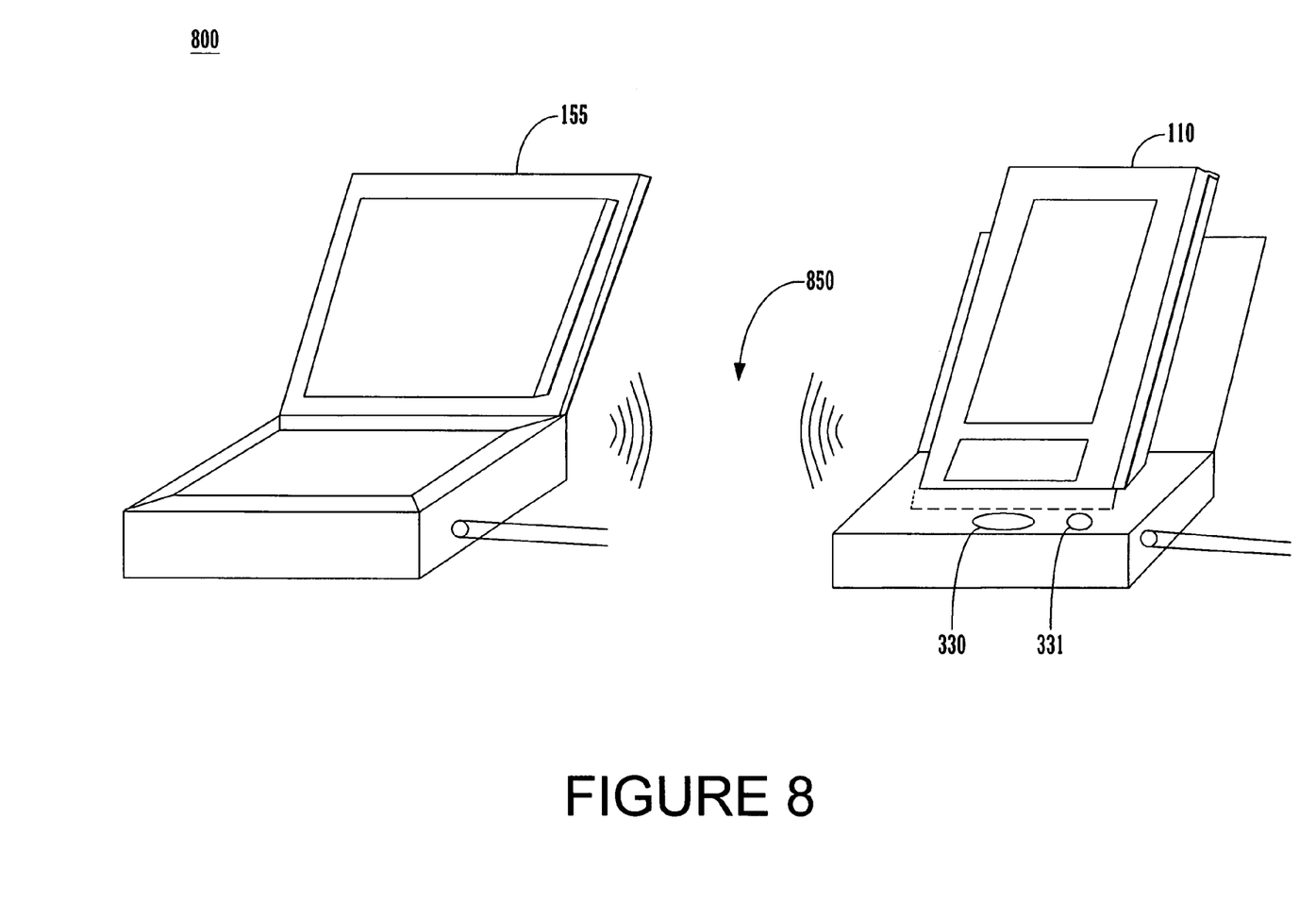
FIG. 8 illustrate a wireless communication session between the handheld computer system and a host device.

FIG. 8 illustrates a wireless communication session between portable computer system 110 and host device 155. It is appreciated that in one embodiment of the present invention a physical serial communication port is eliminated and replaced with a wireless communication port capable of communication with other devices by any of a number of well known wireless communication standards and protocols, e.g., parallel, USB, SCSI, Firewire (IEEE 1394), Ethernet, etc. In the example of FIG. 8, synchronization may take place while recharging occurs. It is appreciated that cradle 300 need not be connected to host computer 155 by any physical means as shown by 850.

Figure 9:
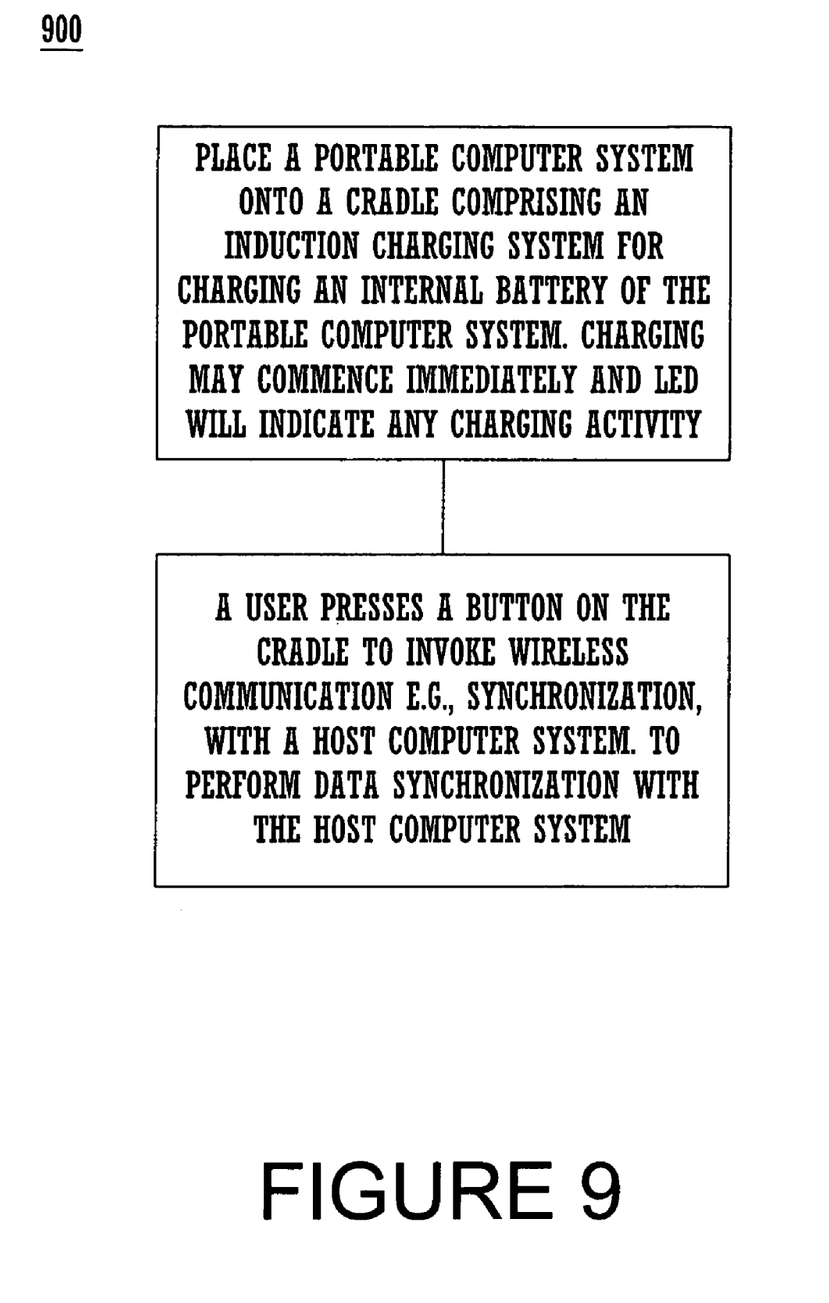
FIG. 9 is a flow diagram of the steps in a process 800 for induction charging and wirelessly communicating with a handheld computer system.

FIG. 9 is a flow diagram of the steps in a process 900 for induction charging and wirelessly communicating with a handheld computer system.

In step 910 portable computer system is placed onto a cradle comprising an induction charging system for charging an internal battery of the portable computer system. Charging may commence immediately and LED 331 will indicate any charging activity.

Step 920, in accordance with the present invention, a user pressing a button on the cradle 300 invokes a wireless communication e.g., synchronization with a host computer system to perform data synchronization with the host computer system.

For example, a portable computer system can be equipped with one of several wireless technologies (e.g, GSM with Short Massage Service (SMS), NBS (Narrow Band Sockets), cellular technologies (e.g., CDMA, TDMA), LAN access technologies (e.g., IEEE 802.11, Home RF) and PAN technologies (e.g., Bluetooth, IR)), thus capable of performing wireless synchronization. The same portable computer system may be equipped to synchronize information with other computer system equipped similarly.

Many users of portable computer systems also own personal computers. Often, a user runs applications in one system, which are similar to the applications and data in their other computer systems. A user, who owns both a palm size computer system and a personal computer, in similar circumstances, may wish to run an application in one system and update the other system accordingly without running the same application in the second computer system. In one embodiment of the present invention one computer system wirelessly synchronizes data with another computer system using well known processes. For example a user updates the calendar in portable computer system and updates the calendar in the personal computer system. The user does not need to run that same application on his/her personal computer.

Such an update is possible through synchronization, in accordance with teaching of "A METHOD AND APPARATUS FOR SYNCHRONIZING INFORMATION ON TWO DIFFERENT COMPUTER SYSTEM" U.S. Pat. No. 5,727,202 issued to Kucala on Mar. 10, 1998; and also teaching in "A METHOD AND APPARATUS FOR SYNCHRONIZING INFORMATION ON TWO DIFFERENT COMPUTER SYSTEMS" U.S. Pat. No. 5,832,489 issued to Kucala on Nov. 3, 1998, both of which are hereby incorporated herein by reference.

Synchronization is also described in "METHOD AND APPARATUS USING A PASS THROUGH PERSONAL COMPUTER CONNECTED TO BOTH A LOCAL COMMUNICATION LINK AND A COMPUTER NETWORK FOR IDENTIFYING AND SYNCHRONIZING A PREFERRED COMPUTER WITH A PORTABLE COMPUTER" U.S. Pat. No. 6,006,274 issued to Hawkins et al on Dec. 21, 1999, hereby incorporated herein by reference.

The owner of a palm size computer system and a personal computer system may further wish to share files between portable computer systems and personal computer systems. An easy to use extendible file synchronization system is described in "EXTENDIBLE METHOD AND APPARATUS FOR SYNCHRONIZING FILES ON TWO DIFFERENT COMPUTER SYSTEMS" U.S. Pat. No. 5,884,323 issued to Hawkins et al on Mar. 16, 1999, hereby incorporated herein by reference. A single button press can initiate the synchronization of information between the two systems.

In this embodiment of the present invention synchronization process is by means of wireless communication, thus the devices need not be physically connected and the need for serial connector is eliminated. Furthermore, the rechargeable battery inside the portable computer system can be recharged by means of induction charging system. The cordless induction charging system and wireless communication allows the manufacturer of palm size computer system to manufacture a watertight device, which is ruggedized, e.g., can withstand adverse climate, e.g., those of high moisture content without degradation.

A ruggedized connector-less portable computer, as disclosed by the present invention, provides the owner of these devices with a more durable device. Such a connector-less device is protected against a broken connector or corroded connector simply because no metallic or physical connector is used for either recharging the battery or for synchronization. Additionally, an owner of such a connector-less device will not face a problem of disrupted communication caused by a corroded connector. Furthermore, such a ruggedized device substantially eliminates any problem resulting from rain, water moisture, broken or corroded connectors, which may hinder the operation of similar devices not protected as such.

In summary the present invention provides a method and a system that can wirelessly recharge a battery inside a portable computer system. In accordance with the present invention, the portable computer system is equipped to communicate with other devices, which are equipped to receive information. Furthermore, the present invention discloses a cordless device and without any exposed metal contact for being recharged. The device can be manufactured such that it is resilient to adverse climate conditions.

The foregoing description of specific embodiment of the present invention has been presented for purpose of illustration and description. They are not intended to be exhaustive or to limit the invention to the precise form disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A portable computer system comprising:
   a processor coupled to a bus;
   a memory unit coupled to said bus;
   a flat panel display screen coupled to said bus;
   an internal battery;
   a wireless induction charging system for providing an inductive recharging to recharge said internal battery; and
   a wireless communication port, which is separate from said wireless induction charging system, for communicating with a host computer system to perform data synchronization while said inductive recharging occurs; and
   a housing for containing said processor, said memory unit, said flat panel display screen, said wireless communication port, said internal battery and said wireless induction charging system, said housing being free of any physical connectors that provide mechanical connection to another electronic device.

2. A portable computer system as described in claim 1 wherein said wireless communication port in an infrared port.

3. A portable computer system as described in claim 1 wherein said wireless communication port is a Bluetooth wireless port.

4. A portable computer system as described in claim 1 wherein said wireless communication port is a wireless LAN wireless port.

5. A portable computer system as described in claim 1 wherein said wireless communication port is a wireless radio port compliant with the CDMA protocol.

6. A portable computer system as described in claim 1 wherein said portable computer system is a handheld personal digital assistant.

7. A portable computer system as described in claim 1 that is water tight.

8. A portable computer system as described in claim 1 wherein said flat panel display screen is a liquid crystal display screen.

9. A portable computer system comprising:
   a processor coupled to a bus;
   a memory unit coupled to said bus;
   a liquid crystal display screen coupled to said bus;
   an internal battery;
   a wireless induction charging system for providing an inductive recharging to recharge said internal battery;

a wireless communication port, which is separate from said wireless induction charging system, for communicating with a host computer system to perform data synchronization while said inductive recharging occurs; and a housing for containing said processor, said memory unit, said liquid crystal display screen, said wireless communication port, said internal battery and said wireless induction charging system, said housing being free of any physical connectors that provide mechanical connection to another electronic device; wherein said portable computer system is a handheld personal digital assistant.

10. A portable computer system as described in claim 9 wherein said wireless communication port in an infrared port.

11. A portable computer system as described in claim 9 wherein said wireless communication port is a Bluetooth wireless port.

12. A portable computer system as described in claim 9 wherein said wireless communication port is a wireless LAN wireless port.

13. A portable computer system as described in claim 9 wherein said wireless communication port is a wireless radio port compliant with the CDMA protocol.

14. A portable computer system as described in claim 9 that is water tight.

15. A method of performing communication comprising:
placing a portable computer system that is free of any physical connectors that provide mechanical and electrical connection to another electronic device onto a cradle comprising an induction charging system for performing an inductive recharging an internal battery of said portable computer system; and pressing a button on said cradle to invoke a wireless communication system separate from said induction charging system with a host computer system to perform data synchronization with said host computer system while said inductive recharging occurs.

16. The method as described in claim 15 wherein said cradle is free of any physical connection with said host computer system.

17. A method as described in claim 15 wherein said wireless communication is implemented using infrared communication.

18. A method as described in claim 15 wherein said wireless communication is implemented using Bluetooth wireless communication.

19. A method as described in claim 15 wherein said wireless communication is implemented using wireless LAN communication.

20. A method as described in claim 15 wherein said wireless communication is implemented using wireless radio communication that is compliant with the CDMA protocol.

* * * * *